United States Patent [19]

Terrigno

[11] Patent Number: 5,067,249
[45] Date of Patent: Nov. 26, 1991

[54] MAP SCALING INSTRUMENT

[76] Inventor: Matthew Terrigno, 7321 Rokeby Dr., Manassas, Va. 22110

[21] Appl. No.: 563,604

[22] Filed: Aug. 7, 1990

[51] Int. Cl.[5] ............................................. G01B 3/12
[52] U.S. Cl. .................................... 33/773; 33/780; 33/781
[58] Field of Search .................. 33/779, 780, 781, 782, 33/772, 773, 775

[56] References Cited

U.S. PATENT DOCUMENTS

| | | | |
|---|---|---|---|
| 49,011 | 7/1865 | Tiffany | 33/773 |
| 319,911 | 6/1885 | Knapp | 33/773 |
| 997,648 | 7/1911 | Cavanagh . | |
| 1,405,417 | 2/1922 | Jansson . | |
| 1,718,052 | 4/1927 | Lineaweaver | 33/779 |
| 2,110,757 | 3/1938 | Clarke | 33/773 |
| 2,294,566 | 9/1942 | Malm et al. . | |
| 2,557,450 | 6/1951 | Mentzel . | |
| 2,579,956 | 12/1951 | Owen . | |
| 2,614,330 | 10/1952 | Cederholm . | |
| 2,817,906 | 12/1957 | Hall . | |
| 2,865,103 | 12/1958 | Lolley et al. . | |
| 3,012,328 | 12/1961 | Henson et al. | 33/780 |
| 3,121,956 | 2/1964 | Philbin . | |
| 3,494,039 | 2/1970 | Porter . | |
| 3,497,959 | 3/1970 | Engelsman | 33/773 |
| 3,791,038 | 2/1974 | Polydoris et al. | 33/780 |
| 3,918,163 | 11/1975 | Keating . | |
| 4,215,480 | 8/1980 | Fisher . | |
| 4,253,239 | 3/1981 | Houck . | |
| 4,275,264 | 6/1981 | Houck . | |
| 4,377,850 | 3/1983 | Simpson . | |
| 4,383,301 | 5/1983 | Morita . | |
| 4,472,881 | 9/1984 | Houck . | |
| 4,700,484 | 10/1987 | Frank . | |
| 4,760,647 | 8/1988 | Gillis . | |

FOREIGN PATENT DOCUMENTS

| | | | |
|---|---|---|---|
| 0036726 | 3/1980 | Japan | 33/780 |
| 0036901 | 2/1985 | Japan | 33/779 |
| 0191010 | 8/1989 | Japan | 33/779 |
| 0264948 | 11/1949 | Switzerland | 33/779 |
| 8505175 | 11/1985 | World Int. Prop. O. | 33/773 |

Primary Examiner—Thomas B. Will
Attorney, Agent, or Firm—Neuman, Williams, Anderson & Olson

[57] ABSTRACT

An instrument for measuring and converting scale dimensions such as, for example, mileage values on a map, includes a housing having a tracing wheel at one end for rolling along route lines on the map. The tracing wheel is connected to operate an actuator that causes a digital display to visually indicate a value representative of the degrees of rotation of the tracing wheel, and thus of the mileage between two points on a map. A scale adjusting device is connected with the actuator to adjust the actuator to obtain an accurate mileage indication for different scale maps.

11 Claims, 4 Drawing Sheets

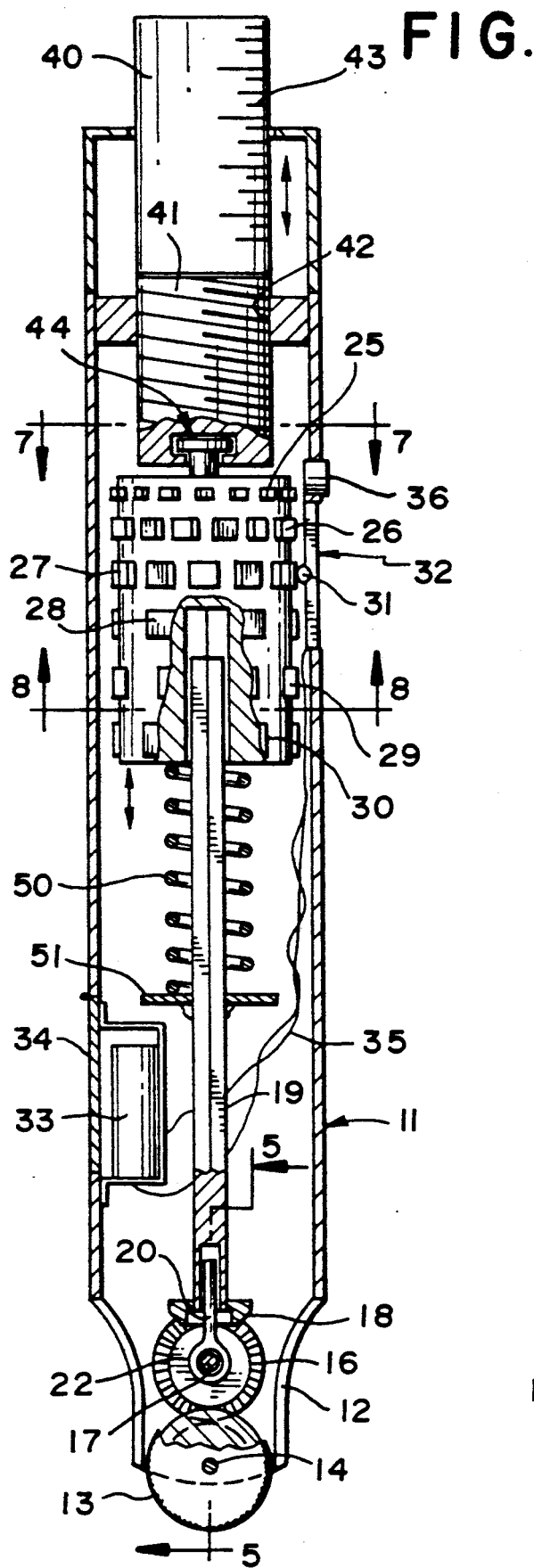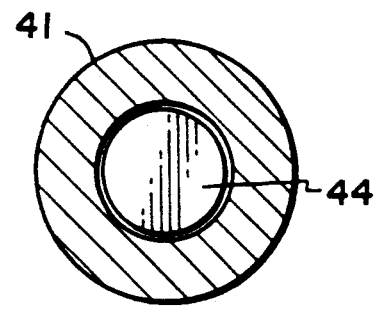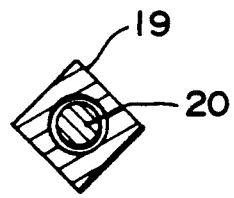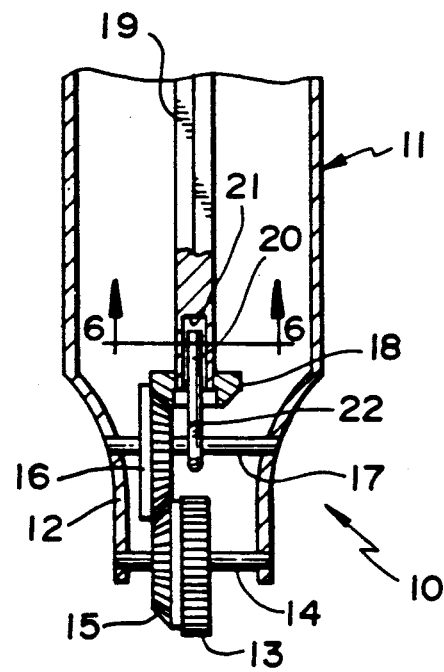

MAP SCALING INSTRUMENT

FIELD OF THE INVENTION

This invention relates to an apparatus for taking measurement, and more particularly, to an instrument for making scale measurement of distances on maps.

DESCRIPTION OF THE PRIOR ART

Maps, and especially road maps, are made to scale with an inch or a fraction of an inch on the map representing a predetermined number of miles. A scale or legend is generally provided on the map for indicating to the user the number of miles represented by an inch or fraction thereof on the particular map under consideration. Additionally, the number of miles between predetermined points on the map are generally indicated adjacent particular routes.

When a user wants to determine the distance between two points on the map, as for example, between two cities, he may either measure the distance along a chosen route between the two cities and then use the legend or scale provided on the map to calculate the mileage, or he may read the number of miles from the map as written next to the selected route, and total up all such readings and/or fractions thereof to calculate the mileage between two points. Since most people using a road map are typically traveling in a vehicle such as a car or the like, the act of reading the map and distinguishing the small figures representative of distances between selected points on the map is a very difficult task. Moreover, the need to calculate distances is time consuming and requires close attention, thereby requiring undivided attention to the task.

Accordingly, there is need for a device which will enable a user to directly and immediately obtain scale measurements from a map without the need for making any calculations and without the need for attempting to read small figures provided on the map.

Various instruments have been developed for measuring the distances between points on maps, including instruments having adjustable means for obtaining scale measurements from maps having different scale.

Examples of prior art measuring devices are disclosed in the following U.S. Pat. Nos.: 997,648; 1,405,417; 1,718,052; 2,294,566; 2,557,450; 2,579,956; 2,614,330; 2,817,906; 2,865,103; 3,121,956; 3,494,039; 3,918,163; 4,215,480; 4,253,239; 4,275,264; 4,377,850; 4,383,301; 4,472,881; 4,700,484 and 4,760,647.

While the devices represented by the foregoing patents have varying degrees of simplicity in design and function, none provides a device that may be easily carried in a pocket or purse and which has adjustable scale means to quickly adapt the device to a particular map scale, and further wherein a visual indication of a measured distance is obtained on a liquid crystal display.

SUMMARY OF THE INVENTION

It is therefore an object of the present invention to provide a device for quickly and easily determining scale distances.

Another object of the invention is to provide a device for obtaining scale measurement from a map, in which the scale may be changed to correspond with the scale given on different maps, whereby accurately scaled measurement may be obtained without the need for making any calculations.

A further object of the invention is to provide a map scaling instrument which is simple and economical in construction and which is easy to use.

Another object of the invention is to provide a measuring instrument for making scaled measurements and in which the measurements are visually displayed on an easy to read liquid crystal display (LCD).

Yet another object of the invention is to provide an instrument for making scaled measurements in which a light is associated with the instrument for illuminating the area being measured.

A still further object of the invention is to provide an instrument for making scaled measurements, in which a marking implement is associated with the measuring device for marking an area or distance being measured.

An even further object of the invention is to provide an instrument for making scale measurements of distances on maps, in which an easy to adjust and read scale changing device is provided for adapting the instrument to use with different map scales.

The foregoing and other objects and advantages of the invention are achieved by an instrument having an elongate housing of generally pen-like design and preferably sized to fit easily in a shirt or jacket pocket or a purse or the like.

A tracing or measuring wheel is rotatably supported at one end of the housing for rolling along a distance to be measured and scaled. The tracing wheel is connected through suitable drive means with an adjustable scaling device for converting the degrees of rotation of the tracing wheel into a scaled dimensional signal that is preferably visually displayed on an LCD. The scaling device may be adjusted to different scale measurements by simple manipulation of a scale indicator and adjustment means projecting from the end of the housing opposite the tracing wheel.

If desired, a light may be provided to illuminate the area being measured by the instrument, and a marking implement may also be provided in association with the scaling instrument for marking an area or distance being measured.

In addition to its special utility for making scaled measurements of distances on maps, the instrument of the invention may also be adapted for use by engineers, draftsmen and the like in making drawings or in taking measurement from drawings. For example, maps are typically scaled in miles or kilometers. The instrument of the invention can easily be changed or adjusted to accomodate either format. Other uses could include the scale measurement of distances on air and sea charts; and use by architects to read and convert scale drawings.

BRIEF DESCRIPTION OF THE DRAWINGS

The foregoing and other objects and advantages of the invention will become apparent from the following detailed description when considered in conjunction with the accompanying drawings, wherein like reference characters indicate like parts o throughout the several views, and wherein:

FIG. 4 is an enlarged, longitudinal sectional view of the scaling instrument of FIG. 1;

FIG. 5 is a further enlarged longitudinal sectional view taken along line 5—5 in FIG. 4;

FIG. 6 is a transverse sectional view taken along line 6—6 in FIG. 5;

FIG. 7 is a transverse sectional view taken along line 7—7

DETAILED DESCRIPTION OF THE PREFERRED EMBODIMENTS

Figure 1:
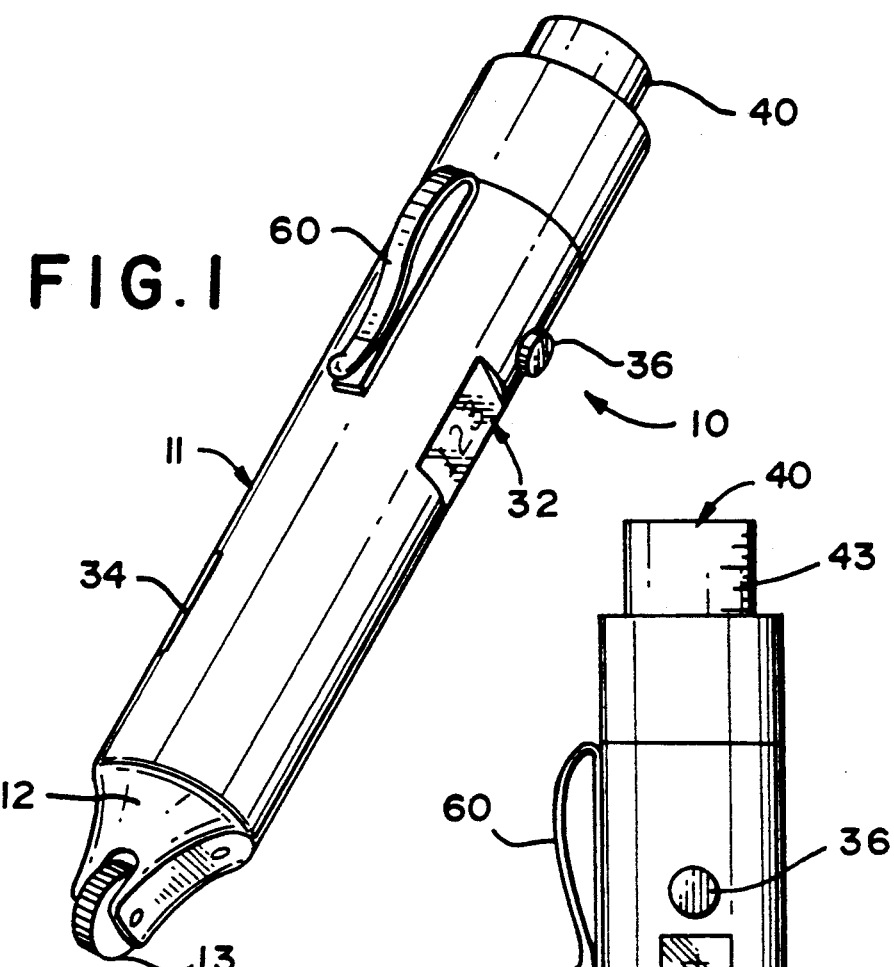
FIG. 1 is a perspective view of the scaling instrument of the invention.
Figure 2:
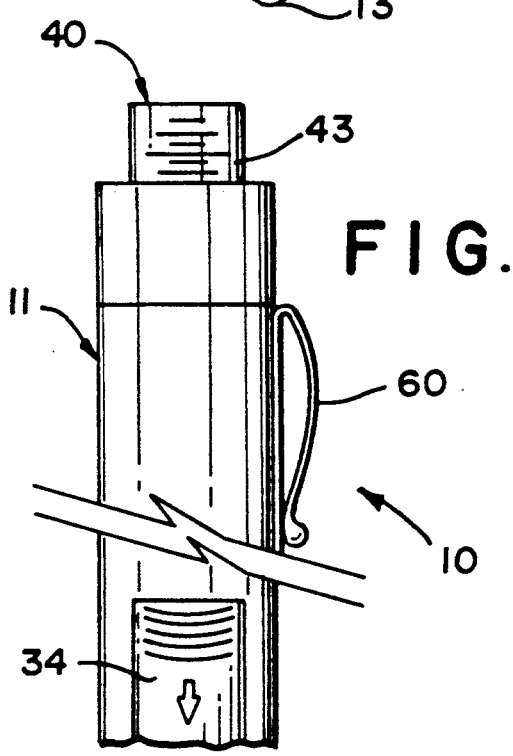
FIG. 2 is an enlarged fragmentary view in side elevation of a portion of the scaling instrument of FIG. 1.
Figure 3:
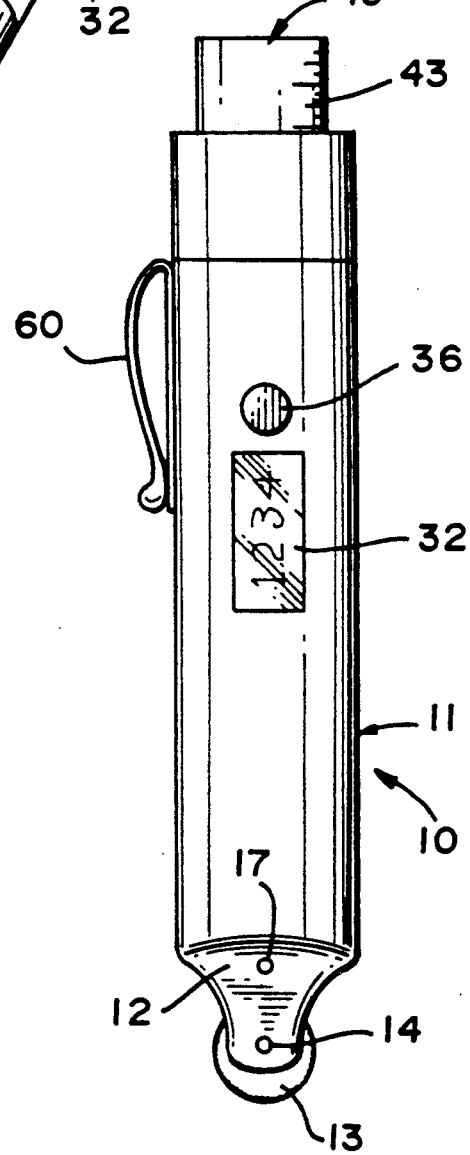
FIG. 3 is an opposite side view in side elevation of the scaling instrument of FIG. 1.
Figure 8:
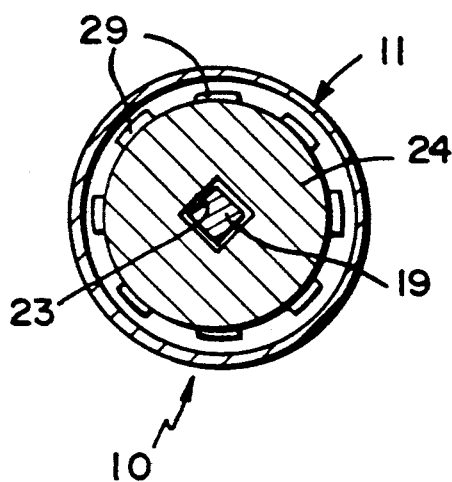
FIG. 8 is a transverse sectional view taken along line 8—8 in FIG. 4.

A first form of the invention is indicated generally at 10 in FIGS. 1-8. This form of the invention comprises an elongate cylindrical barrel or housing having a reduced diameter inwardly tapered end 12 that rotatably supports a measuring or tracing wheel 13. The wheel 13 preferably has a roughened peripheral edge to prevent it from slipping on a surface along which the instrument is being moved to measure a distance. As seen best in FIGS. 3, 4, and 5, the wheel 13 is carried on a pin or axle 14 extending between opposite sides of the reduced end 12. Suitable gear means, such as bevel gear 15, rotates with the wheel on the axle 14.

An intermediate gear 16 is rotatable on a second axle 17 spaced longitudinally in the housing from the axle 14, with the gear 16 in meshing engagement with the gear 15, and engaged in driving relationship with a driven gear 18 carried on the lower end of an actuator shaft 19 extending longitudinally within the housing 11. The actuator shaft 19 is maintained in position, with the gear 18 in meshing engagement with the gear 16, by a retaining pin 20 having one end extending longitudinally into a bore 21 in the lower end of the shaft 19 and another end formed as a loop 22 disposed over the axle 17.

The actuator shaft 19 is caused to rotate about its longitudinal axis by the gears 15, 16 and 18, and the pin 20 and bore 21 are both round in cross section to enable relative rotation between the shaft and the pin.

The outside surface of pin 19 is polygonal in cross section and extends at its upper end into a correspondingly shaped bore 23 formed coaxially in an actuator cylinder 24 rotatable in the housing 11 with the shaft 19. The actuator cylinder 24 is free to slide telescopically on the end of actuator shaft 19, but is constrained to rotate therewith because of the mating polygonal cross-sections of the shaft 19 and bore 23.

A plurality of rows 25-30 of actuator protrusions are formed on the outer surface of the actuator cylinder 24, with the protrusions in adjacent rows being spaced different distances apart in a circumferential direction. The protrusions in respective rows are arranged to cooperate with an actuator o button 31 associated with LCD device 32 mounted in the side of the housing 11, whereby as the actuator cylinder 24 rotates the protrusions actuate the button 31 to change the display on LCD 2.

Power to the LCD is provided by a battery 33 mounted in an openable compartment 34 and connected to the LCD device by wires 35. An on/off button 36 is arranged to selectively interrupt power to the LCD device.

A calibration pin and scale selector member 40 is positioned coaxially in the end of housing 11 opposite the wheel 13 and has a threaded portion 41 engaged with a threaded ring 42 secured in the housing 11, whereby the pin 40 is moved axially within the housing upon being rotated relative thereto. The upper end portion of the pin 40 is calibrated with a scale 43 which cooperates with the end of the housing to provide an indication of the adjusted setting of the pen 40.

The lower or inner end of the pin 40 is coupled with the upper end of the actuator cylinder 24 by interfitting projection and recess means 44 that permits relative rotational movement between the pin 40 and actuator cylinder 24 but prevents relative axial movement therebetween. Consequently, when the calibration pin 40 is rotated relative to the housing and thus relative to the threaded ring 42, it moves axially within the housing and thereby causes the actuator cylinder 24 to move a corresponding axial distance in the housing, thus positioning a different row of protrusions in cooperative association with the actuator button or pin 31 on the LCD device.

For instance, each row 25-30 of protrusions may correspond with a different map scale in which some unit of measure is equivalent to another unit of measure. By setting the scale 43 to correspond with the scale on the particular map under consideration, an appropriate row of protrusions is positioned to actuate the LCD to provide a Visual indication of the distance being measured.

The actuator shaft 19 and actuator cylinder 24 are kept in yieldable, mutually opposed relationship by a coil spring 50 engaged between the lower end of the cylinder and a stop or spring abutment 51 secured on the actuator shaft 19.

Suitable means, such as clip 60 or the like may be provided on the side of housing 11 for securing the instrument to the edge of a pocket or the like.

Figure 9:
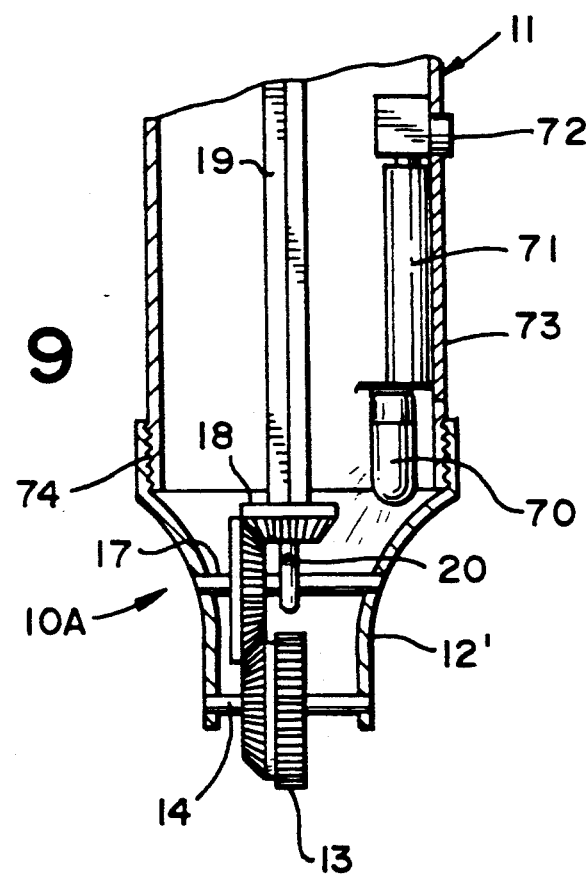
FIG. 9 is a still further enlarged, fragmentary, longitudinal sectional view of a modified form of the invention shown in FIG. 5, wherein a light is provided to illuminate the area being measured by the device.

A first modification of the invention is illustrated at 10A in FIG. 9 and is substantially identical to that form of the invention previously described, except that a light 70 is mounted in the housing adjacent the reduced diameter end 12' for illuminating the area contacted by the wheel 13. A battery 71 is operatively associated with the light 70 for energizing the light and on/off switch 72 may be provided to selectively interrupt power to the light as desired. A removable cover 73 enables access to the light and battery for replacement or repair, as needed. Moreover, the reduced diameter end 12' is removable via threaded connection 74.

Figure 10:
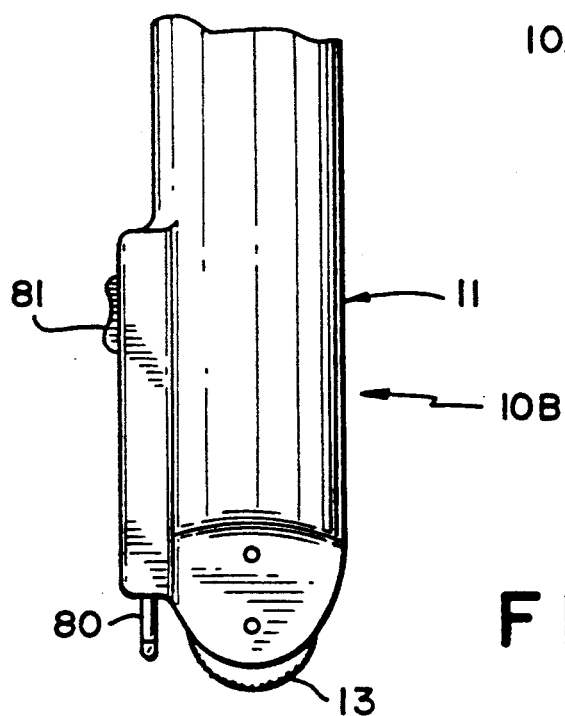
FIG. 10 is an enlarged fragmentary view in side elevation of a further modification of the invention in which a marking implement is provided in combination with the tracing or measuring wheel.

A second modification of the invention is indicated generally at 10B in FIG. 10 and is substantially identical to that form of the invention illustrated and described in connection with FIGS. 1-8, except that a marking implement 80 is provided in association with the housing 11 for marking an area traversed by the wheel 13. The marking implement 80 may be extended or retracted to and from operative position by a manual actuator 81, if desired. The marking implement 80 and actuator 81 may be of any suitable conventional design, such as a ball point pen type mechanism or a simple sliding friction fit.

Figure 11:
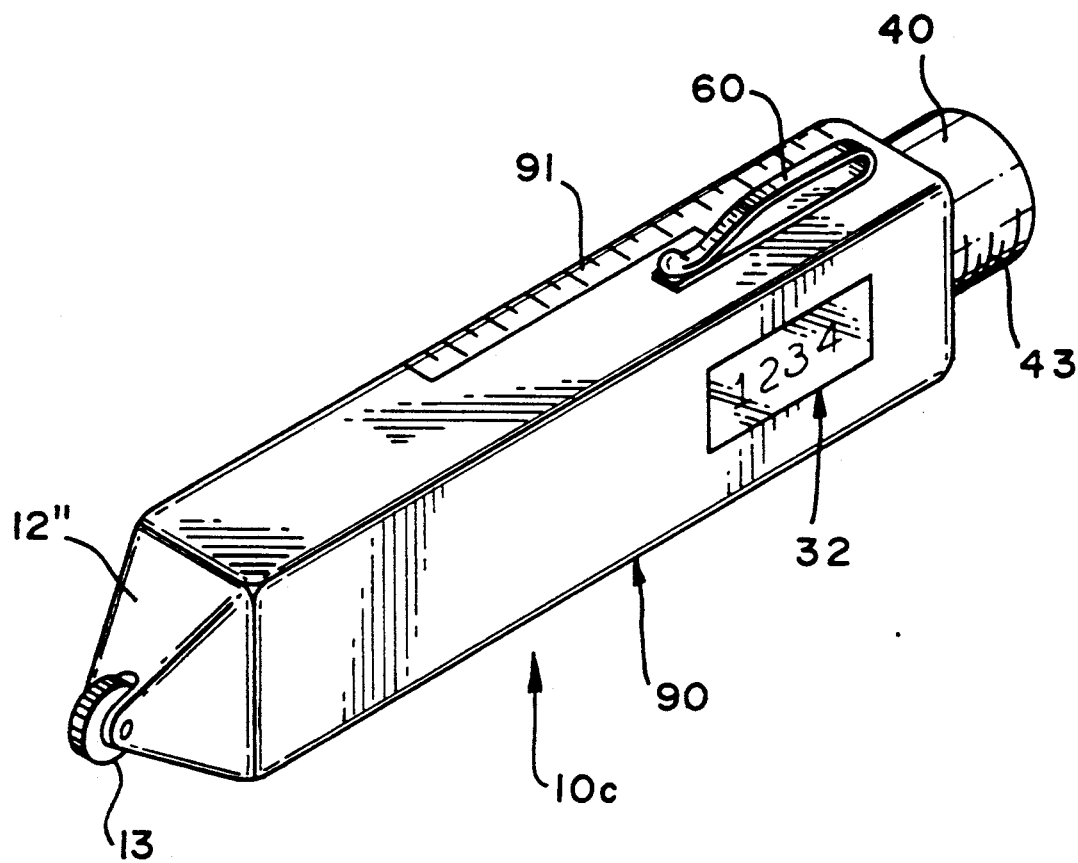
FIG. 11 is a perspective view of another modification of the invention in which the housing has a rectangular cross sectional configuration.

A third modification of the invention is indicated generally at 10C in FIG. 11. This form of the invention is substantially identical to that described in relation to FIGS. 1-8, except that the housing 90 has a polygonal cross-sectional configuration and a scale 91 is provided along one side of the housing. Also, the reduced diameter end 12" has a slightly different shape than that previously described because of the different configurations of the respective housings.

The various components comprising the instrument of the invention may be made of any suitable material, including metal, plastic, and the like.

In use, the scale of the particular map or other item being measured is observed and this scale is then selected on the scale selecting device 40 by rotating the projecting portion of pin 40, which advances the device in the threaded ring 42. The appropriate scale can be observed on the scale 43. This, in turn, causes the actuator cylinder 24 to move axially in the housing 11, bringing an appropriately spaced row of projections into alignment with the actuator means 31. Thereafter, as the wheel 13 is rolled along the item to be measured, the shaft 19 is caused to be rotated, which causes the actuator cylinder 24 to rotate. This advances the digital display on the LCD device 32, providing a visual indication of the scaled dimension being measured. That is, the device will provide a digital read out of the mileage represented between two points on a scaled map.

While particular embodiments of the present invention have been shown and described for purposes of clarity and examples, many changes, substitutions and modifications to the described embodiments will be readily apparent to those having ordinary skill in the art without departing from the spirit and scope of the present invention, which is defined and limited only by the following claims.

I claim:

1. An instrument for measuring and converting scale dimensions, comprising:
   an elongate housing having first and second ends;
   a tracing wheel rotatably supported on one end of the housing for rolling movement along a dimension to be measured;
   an actuator cylinder rotatably supported in the housing between the ends of the housing for rotation about an axis parallel to the axis of the housing;
   gear means connected between the tracing wheel and the actuator cylinder for rotating the actuator cylinder as the tracing wheel rotates along the dimension being measured;
   an electronic digital numerical display device on a side of the housing for displaying a scale measurement of the dimension being measured;
   actuator means on the actuator cylinder adapted to actuate the digital numerical display device upon rotation of the tracing wheel and actuator cylinder; and
   scale adjusting means on the other end of the housing, connected with the actuator cylinder for adjusting the position of the actuator cylinder relative to the digital numerical display device, whereby the instrument may be calibrated to obtain and display different scale measurements.

2. An instrument as claimed in claim 1, wherein:
   the actuator means comprises a plurality of rows of circumferentially spaced apart projections on an outer surface of said actuator cylinder, said projections arranged to sequentially engage and actuate the digital display as the actuator cylinder rotates, for thereby sequentially advancing the digital display; and
   the projections in adjacent rows of said projections being spaced apart different distances so that the number of actuations per rotation of the actuator cylinder is different for each row.

3. An instrument as claimed in claim 2, wherein:
   the scale adjusting means includes means for repositioning the actuator cylinder in relation to the digital display so that a different row of actuator projections is operative to engage the digital display, thereby enabling the scale conversion to be adjusted.

4. An instrument as claimed in claim 3, wherein:
   the gear means includes an elongate actuator shaft extending longitudinally within the housing, and gears engaged between the tracing wheel and the actuator shaft to impart rotation to the actuator shaft as the tracing wheel is rotated;
   said actuator cylinder is connected with the actuator shaft to be rotated thereby.

5. An instrument as claimed in claim 4, wherein:
   the actuator cylinder is movable axially relative to the actuator shaft but is fixed against rotation relative thereto.

6. An instrument as claimed in claim 5, wherein:
   the scale adjusting means comprises a pin connected at one end to an end of the actuator cylinder and extending at its other end to exteriorly of the housing, said pin being rotatable relative to the actuator cylinder but being fixed against axial movement relative thereto; and
   said pin being threadably engaged with the housing whereby rotation of the pin causes it to move axially relative to the housing, thereby causing said actuator cylinder to move axially relative to the housing.

7. An instrument as claimed in claim 6, wherein:
   said other end of the pin has scale markings on an exterior surface thereof so that a particular scale can be observed and selected for use with the dimension having that particular scale.

8. An instrument as claimed in claim 7, wherein:
   a light is provided in said housing for illuminating an area on which said tracing wheel is rotated.

9. An instrument as claimed in claim 7, wherein:
   a marker is provided in combination with said instrument for marking the path followed by said tracing wheel.

10. An instrument as claimed in claim 7, wherein: a scale is provided on a side of said housing for measuring objects.

11. An instrument as claimed in claim 3, wherein:
    the electronic display is a liquid crystal display device; and includes an actuator button that is engaged by the protrusions on the actuator cylinder as the cylinder rotates, and said button is connected to change the display on the liquid crystal display device each time the button is actuated.

* * * * *